United States Patent [19]

Dybel et al.

[11] 4,171,646

[45] Oct. 23, 1979

[54] LOAD DIFFERENTIAL MONITORING SYSTEM

[76] Inventors: Frank R. Dybel; William P. Dybel, both of 981 Wingate, Olympia Fields, Ill. 60461

[21] Appl. No.: 935,973

[22] Filed: Aug. 22, 1978

[51] Int. Cl.$^2$ .............................................. G01N 3/32
[52] U.S. Cl. ........................................ 73/808; 100/99
[58] Field of Search ...................... 73/811, 808, 810; 100/43, 99; 340/679

[56] References Cited

U.S. PATENT DOCUMENTS

| | | | |
|---|---|---|---|
| 3,930,248 | 12/1975 | Keller | 100/99 X |
| 4,116,050 | 9/1978 | Tanahashi et al. | 100/99 X |

Primary Examiner—Jerry W. Myracle
Attorney, Agent, or Firm—Leydig, Voit, Osann, Mayer and Holt, Ltd.

[57] ABSTRACT

A load monitoring system for monitoring loads that are cyclicaly applied to a force carrying member is disclosed. The load monitoring system comprises a transducer for sensing the loads exerted and a differential load monitoring circuit which receives the transducer signals, generates a normal load reference signal relating to previous load signals received and compares the normal load reference signal to the present load signal to determine when the present load exceeds the previous load by a predetermined amount for successive cycles of operation. The differential load monitoring circuit also includes an inhibit circuit which, during initial start-up of the cyclical load serves to inhibit the operation of the differential load monitoring circuit until such time as the normal load reference signals can be established.

Furthermore, an absolute load monitoring circuit is provided which detects when the loads in the force carrying member have approached the capacity of the force carrying member or any predetermined maximum load.

4 Claims, 2 Drawing Figures

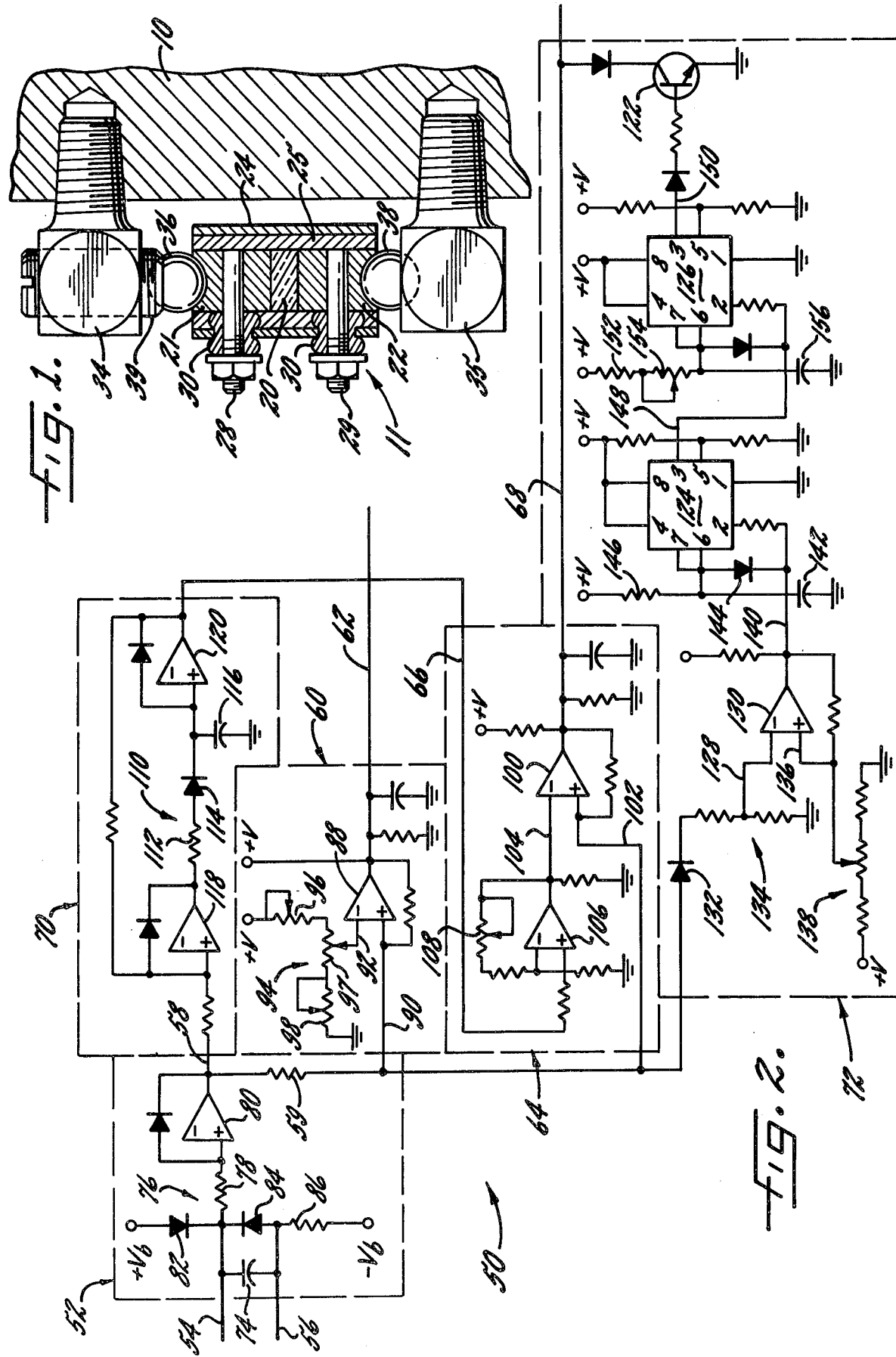

LOAD DIFFERENTIAL MONITORING SYSTEM

The present invention relates generally to load monitoring systems, and more particularly, to systems for monitoring and controlling loads incurred by force carrying members, such as pitmans of production presses.

Systems presently are known for indicating the loads on presses and for automatically detecting if the load incurred by the force carrying member exceeds a predetermined value. Systems, such as shown in the applicant Frank R. Dybel's U.S. Pat. No. 3,612,966, have been found to be highly valuable in controlling costly overload breakdowns. In such systems generally the predetermined value of the load may be detected by an overload detector by selectively setting an overload control dial or the like to any predetermined maximum desired loading, such as any value slightly under the capacity of the press. Such load monitoring systems also have been used to monitor when any significant increase in loading occurs, even though not exceeding the press capacity, since such sudden load increases frequently result from a defective workpiece, die misalignment, or other malfunction which can eventuate in a serious overload. For such purpose, the press operator sets the overload control dial slightly higher than the normal loading the pitman or other press force carrying member incurs during a particular working operation. If a loading exceeds such normal loading by the preset amount, the overload detector is activated.

In large production operations, having numerous presses, it has been found to be highly time consuming to use such overload control devices in the above described manner of controlling sudden changes in loading over the norm, since the press operator must manually set the control dial for each different stamping operation, and change such setting each time a die is changed. In addition, during long periods of uninterrupted press operation, dies have a tendency to become heated and expand, thereby causing the press pitmans to experience progressively greater forces after initial start-up. Thus, if the overload monitoring system is set slightly above the normal loading incurred during initial start-up of the press, unless the control dial is readjusted later, the slowly progressing loads caused by the heat-up will often later actuate the overload detector even though there has been no sharp increase in loading. Because such monitoring systems usually automatically shut down the press upon an overload detection, not only must the control dial then be reset, but production has been interrupted.

It is an object of the present invention to provide a load monitoring system which will automatically and continually track gradual changes in the normal loading on a force carrying member during successive operating cycles and thereby establish a normal load reference, and which will detect differential loading that exceeds the normal load reference by a pre-set differential amount without the need for manual readjustment even though gradual changes in the normal loading on the press might occur from die heat up or the like.

Another object is to provide a load monitoring system of the above kind which will not detect differential loading during start up of the press until such time as a normal load reference can be established.

A further object is to provide a load monitoring system which while tracking gradual changes in the normal loading and detecting differential loading, will also detect any loading of the press which approaches the absolute capacity of the press or other pre-set maximum loading.

Other objects and advantages of the invention will become apparent upon reading of the following detailed description and upon reference to the drawings in which:

FIG. 1 is an enlarged fragmentary section of one of the stress sensing transducers utilized in the illustrated load monitoring system;

FIG. 2 is an electrical diagram of the sensing circuit for the illustrated monitoring system.

While the invention is susceptible of various modifications and alternative constructions, a certain illustrative embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

Referring more particularly to the drawings, there is shown an illustrative system embodying the present invention for monitoring loads that are intermittently incurred by a force carrying member 10, such as the pitman of a punch press. The system includes a transducer 11, which may be of a type described in the applicant Frank R. Dybel's above referred to patent. The transducer includes a piezoelectric ceramic crystal 20 positioned between a top terminal block 21 and a bottom terminal block 22, with the top and bottom faces of the crystal 20 being in contact with and against the surface of each of the respective terminal blocks. The terminal blocks 21,22 and crystal 20 in this case are surrounded by a metallic sheath 24 which serves as a magnetic and electric shield. The sheath 24 is slightly larger than the terminal blocks and crystal to provide space for a surrounding layer 25 of an escapsulating and insulating plastic material. Leading from the terminal blocks through the insulating layer 25 and the metallic sheath 24 are terminals 28,29 with suitable connections for attachment of leads. The terminals 28,29 and hence the terminal blocks are electrically insulated from the sheath 24 at the passageway therethrough by terminal insulators 30. The sheath 24 is grounded to the shield of the shielded cables by suitable connections, not shown.

The transducer 11 preferrably is mounted on the pitman 10 so that a line normal to the crystal faces at the interfaces between the crystal 20 and the terminal blocks 21,22 is parallel to and aligned with the stress to be measured in the pitman 10 when under load during a working cycle. The transducer 11 is supported between two points in spaced relation to the pit man 14 to provide what may be characterized as a parallel mechanical circuit for shunting a small portion of the stress in the member 10 to the transducer 11. The transducer in this case is clamped between the ends of two brackets 34, 35 that are screwed into the member 10. Then ends of the brackets 34, 35 between which the transducer is clamped are provided with ball and sockets in the terminal blocks 21 and 22, respectively. The brackets preferably are electrically insulated from the terminal blocks by the balls 36 and 38 which may be made of a refractory insulating material.

In order to permit desired prestressing of the transducer crystal 20, a set screw 39 is provided in the end of the top bracket 34. After the transducer 12 is in position, the set screw 39 is screwed to secure it under a clamping pressure that places the crystal 20 in a prestressed condition. The amount to which the crystal is prestressed must be sufficient so that it is in a stressed condition under all conditions of loading on the member. In such condition, during the working cycle of the press, the resulting changes in stress in the pitman 10 will act upon the transducer through its support bracketry 34,35 and cause the piezoelectric crystal 20 to produce relatively high voltage output signals proportional to the stress changes.

Turning to FIG. 2, there is illustrated an electronic monitoring circuit 50 which is responsive to the voltage output signals from the transducer 11 and monitors the loading of the force carrying member 10 of the press both as to differential variation in the load from cycle to cycle and as to absolute over-loading with respect to the press' capacity. Generally, the monitoring circuit 50 has an input section 52 with input lines 54 and 56 which are connected to the transducers terminals 28 and 29 (FIG. 1) respectively, and which recieve the transducer signals. The input section 52 receives the transducer signals and amplifies them to produce a load signal at output 58 which is proportional to the stress encountered by the force carrying member 10 during the press' cycle.

The load signal at output 58 is connected through resistor 59 to an absolute overload monitoring circuit 60 which compares the value of the load signal at output 58 to a maximum load reference value. If the load signal at output 58 exceeds the maximum load reference value the absolute overload circuit 60 produces an absolute overload signal on output 62 which can be used to interrupt the operation of the press and activate an indicator to identify the cause of the interruption and the amount of the overload. The absolute overload circuit 60 operates continuously to monitor the value of the load signal at output 58 so that whenever the load on the force carrying member 10 exceeds the maximum load reference value, the press operation will be interrupted.

The load signal at output 58 is also connected through resistor 59 to a differential load monitoring circuit 64 which compares the load signal to a normal load reference signal which is present on line 66. The origin of the normal load reference signal on line 66 will be more fully explained below. If the load signal at output 58 exceeds the normal load reference signal on line 66 by a predetermined amount, a differential overload signal will be generated on line 68. The differential overload signal on line 68 can then be used to interrupt the operation of the press and activate an indicator to identify the cause of the interruption and the amount of the differential overload.

The normal load reference signal on line 66 is provided by means of a load reference tracking circuit 70 which upon receipt of the load signal at output 58, holds the peak value of the load signal and subsequent load signals for each cycle of the press by means of a peak detector circuit and thereby establishes a normal load reference voltage which is proportional to the load for one or more previous cycles of the press. Once the normal load reference voltage has been established on line 66, it is connected by means of line 66 to the differential monitoring circuit 64 for comparison with the present load signal at output 58.

During the operation of a press, the press is often shut down and the dies are changed for a subsequent operation. During shut down, the normal load reference signal goes to zero. If the differential load monitoring circuit is not inhibited during restart it would detect the large difference between the start-up load signal and the zero normal load reference signal and cause an immediate interrupt. Therefore, an inhibit circuit 72 is provided to inhibit the operation of the differential load monitoring circuit 62 until the normal load reference signal has had a chance to establish an initial value. In order to inhibit the differential load monitoring circuit, inhibit circuit 72 disables the output 68 during the time when no signals are being received from the press due to its idle condition. After a predetermined number of cycles has been accomplished upon restart of the press, timers in the inhibit circuit 72 time out and re-enable output lines 68 so that any sudden increase in the differential load causes output line 68 to interrupt the press.

With continuing reference to FIG. 2, a more detailed description of the construction and operation of the monitoring circuit 50 will give a greater insight into its operation. When the transducer signals are received on input lines 54 and 56, a filter capacitor 74 is provided to filter out all high frequency transient signals resulting from the operation of the transducer. The filtered signal on line 54 is then fed through resistor 78 to operational amplifier 80. A biasing network 76 includes a positive bias voltage $+V_b$, diodes 82 and 84, resistor 86 and negative bias voltage $-V_b$. The output of the operational amplifier, the load signal on output 58, is proportional to the stress experienced by the force carrying member 10 (FIG. 1) of the press.

The load signal on output 58 is then fed to an absolute overload monitoring circuit 60. The absolute overload monitoring circuit 60 comprises comparator 88 which has one of its inputs 90 connected to the load signal on output 58 by means of resistor 59. The other input 92 of the comparator 88 is connected to a maximum load reference network 94 which simply provides a maximum load reference voltage that is adjustable by means of variable resistors 96, 97 and 98. The maximum load reference value established by the network 94 is then compared by means of comparator 88 to the value of the load signal on line 90. If the load signal on line 90 exceeds the reference value on input 92, the comparator produces a positive signal on line 62 which in turn can be used to interrupt the press or sound an alarm. The signal on line 62 also can activate an indicator to inform the operator that the interrupt was caused by an absolute overload. The signal on line 62 can also be used to latch a holding device (not shown) which can hold the value of the load signal (output 58) for display.

The operator of the press by adjusting the reference network 94 can set the value of the stress (less than the capacity of the press) for which the absolute overload monitoring circuit 60 will be activated and the press will be interrupted.

The load signal on output 58 is also fed by means of resistor 59 to the differential load monitoring circuit 64. The differential load monitoring circuit 64 comprises a comparator 100 which has inputs 102 and 104. Input 102 is connected to the load signal on output 58 by means of resistor 59. The other input 104 receives an amplified version of the normal load reference signal on line 66. The amplified normal load reference signal is provided by an operational amplifier 106 which receives the normal load reference signal on line 66 and amplifies it. The operational amplifier 106, however, provides variable resistor 108 in its biasing network which allows the operator to adjust the amplification of the normal load reference signal so that a predetermined value of the differential voltage can be established. A more detailed description of the generation of the normal load reference signal on line 66 will appear below.

In essence the signal on input 104 is proportional to the peak value of the load signals for one or more of the previous cycles of the press. The load signal on input 102 is proportional to the load signal for the present cycle of the press. Therefore, comparator 100 compares the value of the load signal for the present cycle of the press (line 102) to the peak value of the load signal for one or more previous cycles of the press. If the present value of the load signal on line 102 exceeds the value of the previous load signals on line 104 by a predetermined amount, the comparator 100 produces a positive signal on output line 68 which in turn can be used to interrupt the press or sound an alarm. Furthermore, the signal on line 68 can activate an indicator to inform the operator that the interrupt was caused by a sharp variation in the loading of the press. The signal on line 68 can also be used to latch the last value of the normal load reference signal and the last value of the load signal for display.

The normal load reference signal on line 66 is provided by load reference tracking circuit 70 which comprises a peak detector circuit 110 including resistor 112, diode 114 and capacitor 116. An operational amplifier 118 is provided to receive the load signal on output 58 and amplify it prior to the load signal passing to the peak detector 110. The value of resistor 112 and capacitor 116 determine the rate at which the charge on capacitor 116 builds up to the peak value of the load signal 58 as amplified. If the time constant of resistor 112 and capacitor 116 is long, then it may take several cycles before the peak voltage is established on capacitor 116, and therefore, several cycles are required before the normal load reference signal has been established. Once the charge on the capacitor 116 has been established after one or more press cycles, that signal is amplified by operational amplifier 120 which produces at its output 66 the normal load reference signal which is then used as the reference in the differential load monitoring circuit 64.

Finally, it should be appreciated that when the press is shut down to change dies or the like that the normal load reference signal on line 66 will go to zero. Upon restart of the press, and with the normal load reference signal on line 56 at zero, the first load signal on output 58 would in the ordinary case exceed the zero value of the normal load reference signal by the predetermined amount and immediately interrupt the operation of the press by putting a high voltage on output line 68. In order to assure that the differential load monitoring circuit 64 is not immediately activated upon restart because of the low value on the normal load reference line, an inhibit circuit 72 is provided.

The inhibit circuit 72 includes transistor 122 which has its collector connected to output line 68 and its emitter connected to ground. When the transistor is turned on, any positive voltage on line 68 which may result when the differential between the normal load reference signal and the load signal on output 58 exceed the predetermined amount will be shunted to ground through the transistor. When the transistor is turned off the collector of transistor 122 will be open and output 68 of the differential load monitoring circuit will be under the control of comparator 100.

The inhibit circuit 72 furthermore includes timers 124 and 126 which together form a missing pulse detector circuit. The timers 124 and 126 are identical integrated circuits such as a Signetics timer model No. 555. The numbers 1 through 8 shown around the periphery of each timer indicates the pin assignments for the Signetics timer.

Taking first the situation in which the press is operating on a cyclical basis and has been operating for some period of time, the load signal on output 58 is connected to input 128 of a comparator 130 by means of resistor 59, diode 132 and biasing network 134. The other intput 136 of comparator 130 is connected to a reference network 138. The comparator 130 is provided to detect the cyclical load signals on output 58 and produce a negative going pulse on its output 140 each time a cyclical load signal appears on output 58. The comparator 130, by means of the reference network 138, is biased with a low reference point so that an output signal on output 140 occurs for each load signal on output 58. There is however, sufficient noise immunity in the reference point so that an output pulse on output 140 does not result from transients or other spurious signals on output 58. Therefore, comparator 130 operates as a buffering stage to produce a string of negative going pulses, of constant value, for each cyclical stroke of the press.

Each time timer 124 receives a negative going pulse from output 140, output 148 (pin 3) of timer 124 is immediately forced to a positive value. Furthermore a negative going pulse on line 140 discharges capacitor 142 through diode 144. Capacitor 142 in conjunction with resistor 146 provide an RC timing network which, when line 140 returns to a high value, begins timing out a time period which is slightly greater than the time between cyclical strokes of the press, but not greater than the time required for two strokes of the press. If then a second negative pulse arrives on output 140 before the timer 124 has timed out, the second negative going pulse will initialize the timing circuit (resistor 146 and capacitor 142) and cause the output 148 to remain in a high state. If the second negative going pulse had not arrived before the timing circuit (resistor 146 and capacitor 142) had timed out, the output 148 of timer 124 would have returned to its low condition.

Still focusing on the continuous operation of the press, line 148 remains in its high state during all times that a constant string of cyclical pulses are being delivered on output 140. With line 148 in its high state, the input to timer 126 (pin 2) is also a constant high. As a result, the output 150 (pin 3) of timer 126 is a constant low. With line 150 at a constant low, transistor 122 is turned off and line 68 is not disabled by transistor 122.

If, for example, a pulse on line 140 is missing, or a string of pulses is missing due to the press being shut down, line 140 will become high, and after the time constant of resistor 146 and capacitor 142 has timed out, output 148 will become low. As soon as line 148 becomes low, the input to timer 126 will go low (discharging capacitor 156 through diode 157 to initialize timing circuit-resistor 152, variable resistor 154 and capacitor 156), and the output 150 of timer 126 immediately goes high. With output 150 high, transistor 122 is turned on thereby grounding line 168 and disabling the operation of the differential load monitoring circuit 64.

Upon restart of the press, a train of negative going pulses is again present on line 140. The first negative going pulses causes output line 148 of timer 124 to immediately go high. With a high now present on line 148 and therefore present at the input to timer 126, a timing network including resistor 152, variable resistor 154 and capacitor 156 begins charging from its initialized state. As long as the negative going pulses continue on line 140, output line 148 remains high and the timing circuit (resistors 152 and 154 and capacitor 156) of timer 126 charges up to a sufficient value so that output 150 switches from its high state to a low state, thereby disabling transistor 122 and enabling the operation of the differential load monitoring circuit 64.

The time constant of the timing network (resistor 152, resistor 154 and capacitor 156) of timer 126 is selected so that timer 126 times out (output 150 goes from high to low) after the peak detector 110 of the load reference tracking circuit 70 has had a chance to establish the normal load reference signal which is to be used in making the differential load comparison.

Once the normal load reference signal has been established after a predetermined number of cycles and timer 126 has timed out in a comparable amount of time, the inhibit circuit 72 ceases to effect the operation of the differential load monitoring circuit 64, and operation proceeds until an excessive differential load is encountered or an absolute maximum overload is encountered.

We claim as our invention:

1. A load monitoring system for monitoring loads that are cyclically applied to a force carrying member comprising:

a. a transducer mounted on the force carrying member for generating an electrical signal substantially proportional to the load exerted on the force carrying member, b. differential load monitoring means responsive to the transducer signal and including reference tracking means for establishing a normal load reference and automatically updating the normal load reference on successive cycles, and detection means for determining when the load exceeds the normal load reference by a predetermined amount during a successive cycle of operation.

2. The load monitoring system of claim 1, wherein the differential load monitoring means further comprises an inhibit means for disabling the detection means during initial start-up of the cyclically applied forces so that the reference tracking means can establish an initial normal load reference.

3. The load monitoring system of claim 2, wherein the inhibit means disables the detection means for at least the first cycle of operation.

4. The load monitoring system of claim 1, wherein the load monitoring system further comprises an absolute overload monitoring means which constantly monitors the loads for detecting when loading exceeds a predetermined maximum load.

* * * * *